(12) United States Patent
Loringer

(10) Patent No.: US 6,573,474 B1
(45) Date of Patent: Jun. 3, 2003

(54) PROCESS FOR DRILLING HOLES THROUGH A THERMAL BARRIER COATING

(75) Inventor: Gary Loringer, Stuart, FL (US)

(73) Assignee: Chromalloy Gas Turbine Corporation, San Antonio, TX (US)

(*) Notice: Subject to any disclaimer, the term of this patent is extended or adjusted under 35 U.S.C. 154(b) by 23 days.

(21) Appl. No.: 09/691,767

(22) Filed: Oct. 18, 2000

(51) Int. Cl.[7] .............................................. B23K 26/38
(52) U.S. Cl. .............................. 219/121.71; 29/889.721
(58) Field of Search ................... 219/121.7, 121.71, 219/121.76, 121.77; 29/889.721

(56) References Cited

U.S. PATENT DOCUMENTS

| | | | | |
|---|---|---|---|---|
| 4,169,976 A | | 10/1979 | Cirri ....................... 219/121.85 |
| 4,756,765 A | | 7/1988 | Woodroffe ....................... 134/1 |
| 4,952,789 A | * | 8/1990 | Suttie |
| 5,117,087 A | | 5/1992 | Baker et al. ............ 219/121.71 |
| 5,181,379 A | * | 1/1993 | Wakerman et al. |
| 5,216,808 A | | 6/1993 | Martus et al. .............. 29/889.1 |
| 5,609,779 A | * | 3/1997 | Crow et al. ............ 219/121.71 |
| 5,683,600 A | * | 11/1997 | Kelley et al. .......... 219/121.71 |
| 5,747,769 A | * | 5/1998 | Rockstroh et al. ..... 219/121.71 |
| 5,760,369 A | * | 6/1998 | Wenkman ............... 219/121.71 |
| 5,771,577 A | * | 6/1998 | Gupta et al. ........... 29/889.721 |
| 6,004,620 A | * | 12/1999 | Camm |
| 6,032,361 A | | 3/2000 | Makino et al. ............. 29/889.2 |
| 6,130,405 A | | 10/2000 | Loringer ................ 219/121.71 |
| 6,172,331 B1 | * | 2/2001 | Chen ..................... 219/121.71 |
| 6,234,755 B1 | * | 5/2001 | Bunker et al. |
| 6,243,948 B1 | * | 6/2001 | Lee et al. .............. 29/889.721 |
| 6,307,175 B1 | * | 10/2001 | Blochinger et al. .... 219/121.71 |
| 6,329,632 B1 | * | 12/2001 | Fournier et al. ......... 219/121.7 |

FOREIGN PATENT DOCUMENTS

| | | | |
|---|---|---|---|
| EP | 0826457 | 3/1998 | |
| JP | 3-142090 A | * 6/1991 | .............. 219/121.7 |
| JP | 8-323488 A | * 12/1996 | |

* cited by examiner

Primary Examiner—Geoffrey S. Evans
(74) Attorney, Agent, or Firm—Mitchell D. Bittman

(57) ABSTRACT

A method is provided for drilling a hole through a metallic workpiece having a thermal barrier coating with a ceramic top coat by laser drilling a counterbore to a depth which extends through the ceramic top coat but not substantially into the metallic workpiece and then laser drilling the hole through the workpiece aligned with the counterbore, the counterbore having a diameter larger than the hole.

12 Claims, 3 Drawing Sheets

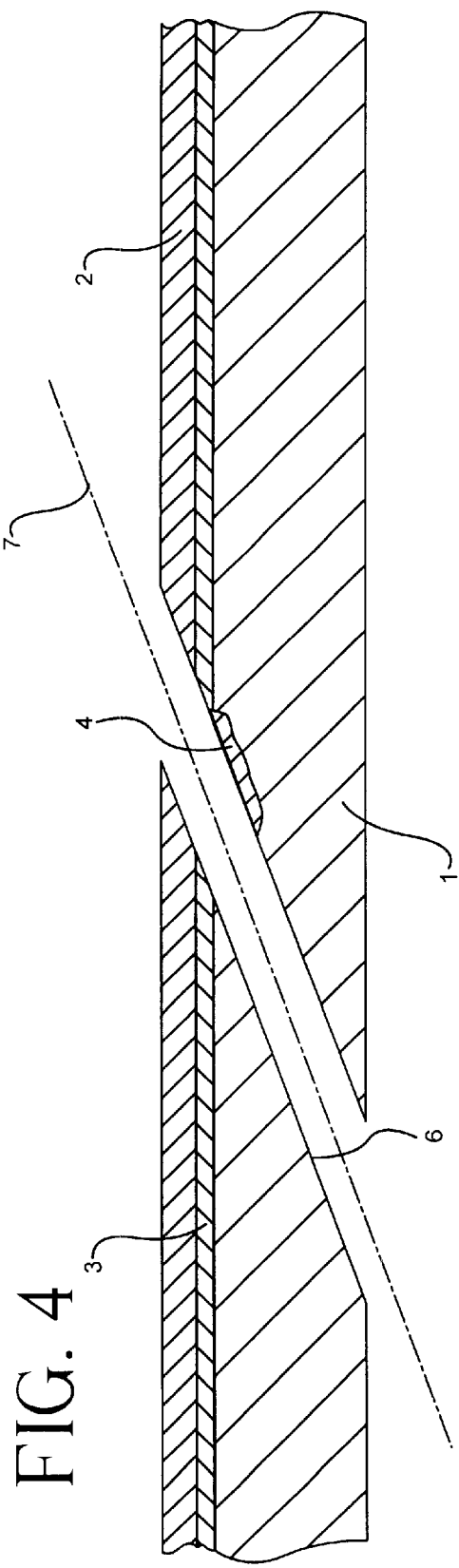
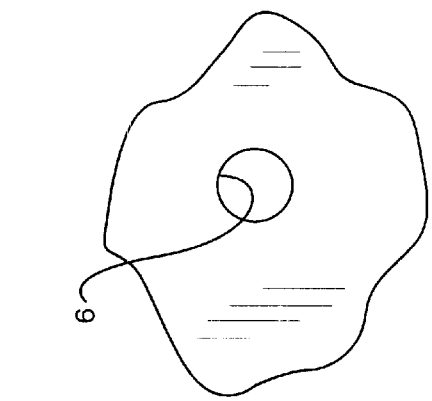

PROCESS FOR DRILLING HOLES THROUGH A THERMAL BARRIER COATING

BACKGROUND OF THE INVENTION

A combustion liner which is used in an aerospace application or in a land based turbine application will have a series of laser drilled holes drilled at an angle to produce a cooling effect during operation. The laser drilled cooling holes are called effusion holes. A typical component will have several thousand effusion holes in order to facilitate the proper cooling pattern. Effusion holes are characteristically drilled at very steep angles (see Figures) to the surface of the component (eg. 170–250). These effusion holes can be laser drilled by three different processes: trepan; percussion drilling; or Laser-on-the-Fly. The trepan method of laser drilling, which pierces the material with a focused beam, then traverses around the hole circumference to produce the hole, is by far the most time consuming. A trepanned laser hole can take from 8 to 12 seconds per hole, dependent on material thickness and angle of entry. The percussion method of laser drilling uses a defocused laser beam to produce the hole by employing a series of pulsed laser shots into the metal until the hole has fully been produced. A percussion drilled hole can take from 1 to 5 seconds per hole, dependent on material thickness and angle of entry. The Laser-on-the-Fly method of laser drilling uses a defocused laser beam, while synchronizing the speed of a rotary device and the pulsing of the laser, to drill a plurality of holes during the rotation cycle one pulse at a time (see U.S. Pat. No. 6,130,405). A hole produced by the Laser-on-the-Fly method can take from 0.3 to 2 seconds per hole, dependent on material thickness and angle of entry.

The typical material that is used to produce a combustor liner is a high temperature stainless steel alloy with a melting point of approximately 2400° F. Design engineers, in order to enhance the life expectancy of these components, have added to the component a layer of thermal barrier coating (TBC) having a ceramic top coat. As shown in the Figures, the TBC generally comprises a bond coat 3 to bond the ceramic top coat 2 to the metallic substrate 1. The bond coat can be an MCrAlY bond coat where M is Ni, Co or Fe or a combination of Co and Ni; an aluminide bond coat; or a platinum aluminide bond coat. The ceramic based top coat can be, for example, a zirconia stabilized with yttria. The MCrAlY bond coat can be applied by various processes including plasma spraying, electron beam physical vapor deposition or sputtering, while the ceramic top coat can be applied by various processed including plasma spraying, electron beam physical vapor deposition, sputtering and chemical vapor deposition. The ceramic top coat has a high melting point of, for example, 4500° F.

The addition of this thermal barrier coating, while improving component life and engine performance, has created a problem for the laser drilling operation. When laser drilling through the ceramic coating into the base metal as shown in FIG. 4 a large area of recast 4 is created at the intersection of the base metal of the substrate and the thermal barrier coating. This area of recast has been measured up to 0.024 inches thick. The design specifications for combustion liners of several Original Equipment Manufacturers (OEM) have set the maximum allowable recast level at 0.004 inches thick. A recast layer higher than the acceptable limits is detrimental to the life of the component, since a stress crack can ultimately be produced from the recast layer. The pocket of recast is a direct result of the laser's interaction where the TBC meets the base metal. Since the base metal has a melting point of 2400° F., far less than the 4500° F. of the ceramic top coat, the molten material has a tendency to create a small pocket at the joining point (see FIG. 3). When employing the percussion or Laser-on-the-Fly drilling method, the pocket is created between the first and second pulses. During the subsequent laser pulses, that are required to fully produce the hole, the molten material is being expelled outward. As the material is being expelled outward, a portion of molten material is being redeposited into the pocket that was created. The solidifying of this material in the pocket forms the "bubble" of recast 4 (see FIG. 4).

Many different parameter settings and gas assist combinations were tried to reduce the recast "bubble". The results were similar with all of the combinations that were tested with the recast "bubble" clearly present. When employing the trepan method of laser drilling, the recast "bubble" was eliminated as the laser beam traversed around the circumference. However, due to the extremely long cycle times that would be required to produce the components with the trepan method, this was not an acceptable solution.

BRIEF DESCRIPTION OF THE DRAWINGS

The present invention will be more fully described by way of example with reference to the accompanying drawings in which:

FIG. 4 is a schematic diagram showing the workpiece with a hole drilled in accordance with the prior art.

FIG. 5 is an auxiliary view taken looking down the centerline 7 of the hole 6 of FIG. 4.

SUMMARY OF THE INVENTION

A method is provided for drilling a hole through a metallic workpiece having a thermal barrier coating with a ceramic top coat by laser drilling a counterbore to a depth which extends through the ceramic top coat but not substantially into the metallic workpiece and then laser drilling the hole through the workpiece aligned with the counterbore, the counterbore having a diameter larger than the hole.

DETAILED DESCRIPTION OF THE INVENTION

Laser drilling (employing both percussion and Laser-on-the-Fly (LOF) processes) of aerospace components, that have previously been coated with a thermal barrier coating (TBC), produces a pocket of laser recast which can range up to 0.024 inches thick. The process of this invention significantly reduces or eliminates the pocket of laser recast by using the laser beam to produce a counterbore into the thermal barrier coating prior to drilling the effusion cooling hole.

This process allows hole drilling to be carried out through a metallic workpiece having a thermal barrier coating with a ceramic top coat. While specific examples are provided with regard to gas turbine combustion liners comprised of a stainless steel alloy (eg. GTD 222, Haynes 188 or AMS 5878), other gas turbine components can be drilled by this process as well including, for example, turbine blades and vanes, and exhaust discharge nozzles. Workpieces comprised of other alloys can also benefit from this process, including nickel or cobalt base superalloys. As shown in the Figures, the thermal barrier coating on the workpiece generally comprises a bond coat 3 to bond the ceramic top coat 2 to the metallic substrate 1 and can comprise bond coat and ceramic top coat compositions which are applied by processes as is known in the art. Typically the thickness of the TBC for a combustion liner can be from about 0.003 to 0.010 inches for the bond coat and about 0.009 to 0.020 inches for the ceramic top coat.

Figure 1:
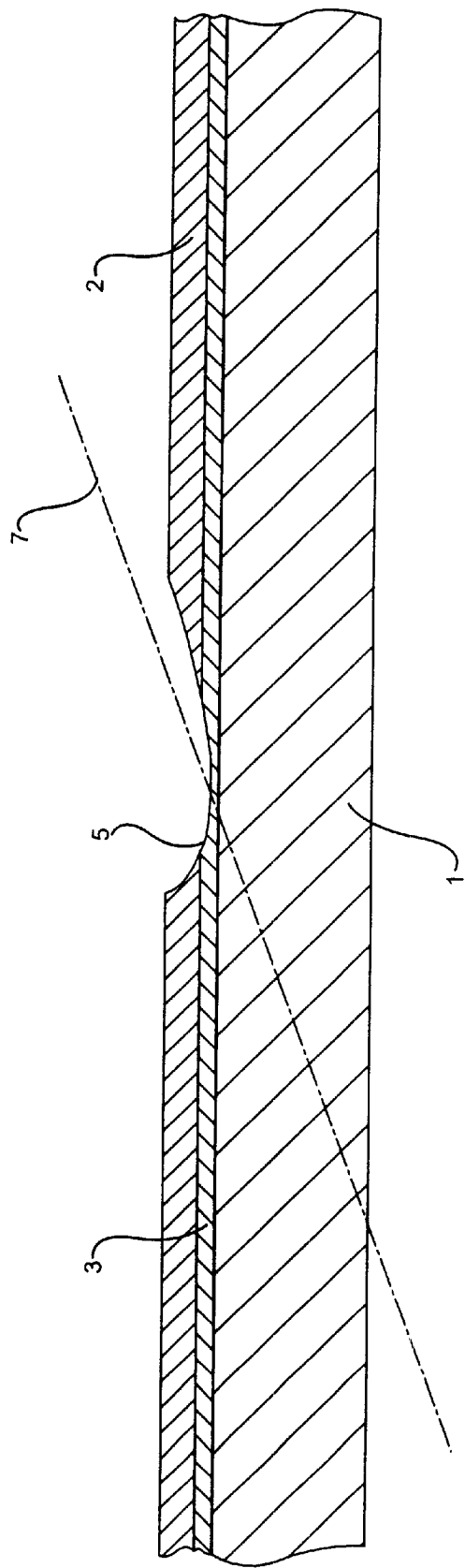
FIG. 1 is a schematic diagram showing the workpiece with a counterbore drilled therein.

When drilling the holes a counterbore 5 is first laser drilled (see FIG. 1). The counterbore 5 is a hole which is bored that is larger in diameter than the primary hole 6, but concentric or aligned therewith. The counterbore 5 produced by laser drilling exhibits a curved or radiused surface as shown in FIG. 1. The diameter of the counterbore 5 is larger than the hole 6 to be drilled to avoid formation of the recast "bubble" during drilling of the hole 6. The counterbore 5 extends or penetrates through the ceramic top coat 2, but not substantially into the metallic substrate 1. Typically the counterbore 5 will extend into the bond coat 3, with the bond coat acting as a buffer layer preventing damage to the metallic substrate 1 during the drilling of the counterbore. The counterbore diameter will generally be about 50 to 150% larger than the hole diameter, preferably about 75 to 125% larger. Typically, for a cooling hole 6 for a combustion liner, the hole diameter is from about 0.019 to 0.024 inches, while the counterbore diameter is from about 0.040 to 0.050 inches.

Figure 2:
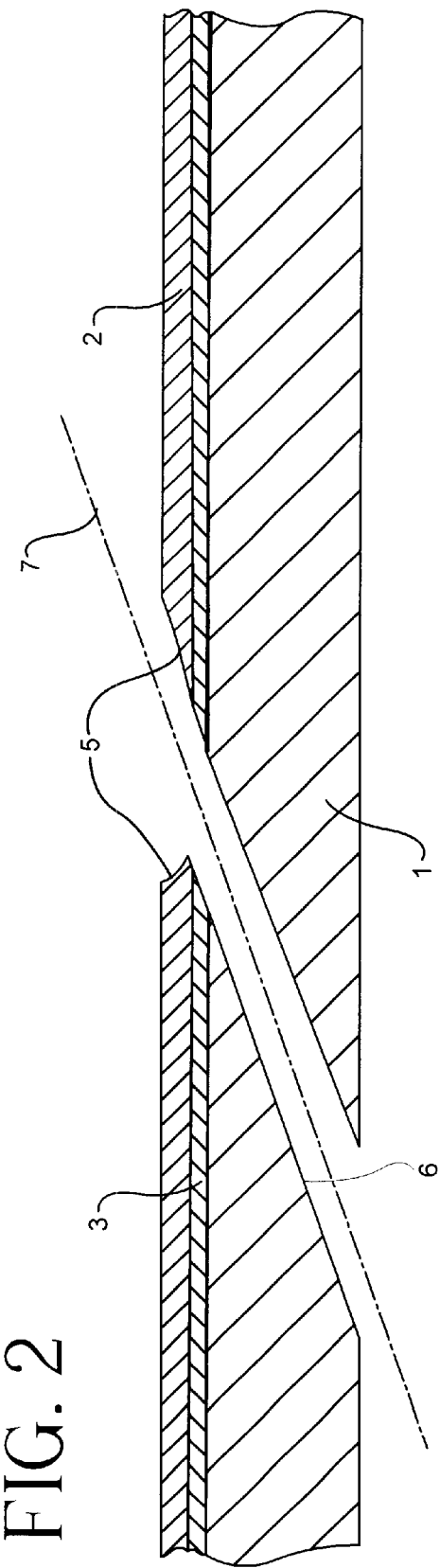
FIG. 2 is a schematic diagram showing the workpiece with a hole drilled according to the present invention.
Figure 3:
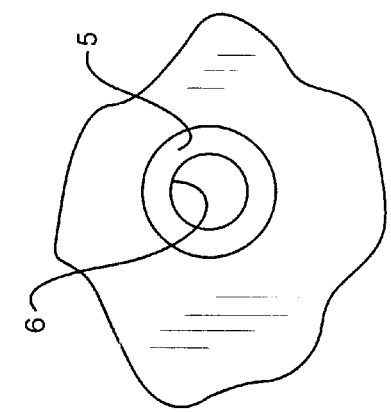
FIG. 3 is an auxiliary view taken looking down the centerline 7 of the hole 6 of FIG. 2.

After drilling the counterbore 5 the hole 6 is laser drilled aligned with the counterbore (see FIG. 2). Since the counterbore is larger than the hole, formation of a recast bubble at the intersection of the TBC and substrate is either significantly reduced or avoided.

EXAMPLE

A cylindrical high temperature stainless steel alloy (AMS 5878) combustor liner was coated with a thermal barrier coating (TBC) comprising 0.003 to 0.008 inches of a NiCrAlY (Mectco Amdry 964) bond coat and 0.009 to 0.014 inches of a yttria stabilized zirconia (Mectco 204 NS) ceramic top coat applied by plasma spraying. The combustion liner requiring a series of effusion cooling holes was fixtured to a rotary device. The rotary device was part of a laser machining center that was controlled by CNC controlled device and was coupled with a pulsed ND: YAG Laser. The laser method of drilled can be either percussion drilling or Laser-on-the-Fly, dependent on the hole pattern design. The side of the component with the TBC was the entrance side of the effusion hole.

The laser head was set to the required entry angle of the effusion hole (20°). The laser head was defocused the determined amount to produce a 0.040 inch diameter counterbore for a 0.020 inch diameter effusion hole. A Lumonics JK-704 ND:YAG Laser was used and set up in the LD1 mode of operation with a 200 mm focus lens. The initial counterbore operation used an assist gas of compressed air.

By defocusing approximately 0.500 of an inch with two laser pulses, the desired diameter (0.040 inches) and depth (0.010 to 0.015 inches) of the counterbore was produced penetrating the ceramic top coat and into the bond coat layer, but not into the substrate. A counterbore 5 as shown in FIG. 1 was formed. The laser drilling was carried out to remove only the ceramic top coat to a larger diameter than the effusion hole. After the entire row of holes with the counterbore settings was completed, the laser head was then defocused back to the determined position to produce the desired effusion cooling hole diameter of 0.020 inches. The assist gas for the effusion hole drilling operation was oxygen. The effusion holes were then drilled in alignment with the counterbore by either percussion or Laser-on-the-Fly laser drilling processes. The effusion cooling holes produced had a reduced layer of recast of about 0.001 to 0.002 inches thick.

A comparative effusion cooling hole drilling operation carried out without the counterbore produced a bubble of recast layer of about 0.010 to 0.020 inches thick and about 0.050 inches long.

What is claimed is:

1. A method of drilling a hole into a metallic workpiece having a thermal barrier coating with a ceramic top coat comprising:
    laser drilling a counterbore to a depth which extends through the ceramic top coat but not substantially into the metallic workpiece; and
    then laser drilling the hole through the workpiece aligned with the counterbore, the counterbore having a diameter larger than the hole.

2. Method of claim 1 wherein the metallic workpiece is a gas turbine combustion liner and the holes are cooling holes.

3. Method of claim 2 wherein the counterbore and hole are drilled by percussion drilling.

4. Method of claim 2 wherein the counterbore and hole are drilled by a Laser-on-the-Fly process.

5. Method of claim 2 wherein the counterbore and cooling holes are drilled at an angle of 17 to 25 degrees to a surface of the workpiece.

6. Method of claim 2 wherein the metallic workpiece comprises a stainless steel alloy.

7. Method of claim 1 wherein the thermal barrier coating further comprises a bond coat bonding the ceramic top coat to the metallic workpiece.

8. Method of claim 5 wherein the diameter of the counterbore is from about 50% to 150% larger than the diameter of the hole.

9. Method of claim 8 wherein the counterbore extends into the bond coat.

10. Method of claim 9 wherein the counterbore has a curved surface.

11. Method of claim 10 wherein the ceramic top coat is a yttria stabilized zirconia.

12. Method of claim 11 wherein the bond coat is selected from the group consisting of MCrAlY wherein M is Ni, Co, Fe or a combination of Ni and Co, platinum aluminide and aluminide.

* * * * *